United States Patent Office 2,890,949
Patented June 16, 1959

2,890,949

PRODUCTION OF CHEMICALS

Jack W. Blanton, Arlington, Mass., and Irwin S. Zonis, Pensacola, Fla., assignors to National Research Corporation, Cambridge, Mass., a corporation of Massachusetts No Drawing. Application June 21, 1957
Serial No. 667,298

6 Claims. (Cl. 75—1)

This invention relates to the production of sodium zirconate and particularly to a process for the continuous caustic fusion of zircon to produce sodium zirconate or a mixture which we prefer to call sodium zirconate. While this mixture largely consists of sodium zirconate and sodium silicate, it may contain substantial quantities of complex sodium silico-zirconates as well as quantities of sodium hydroxide, silica, sodium oxide, zirconium oxide and some unreacted zircon.

In recent years, sodium zirconate has become important as an intermediate product in the process for the production of metallic zirconium which is utilized as an alloying constituent in electronic and electrical applications, in chemical equipment where good corrosion resistance is needed, and most significantly in nuclear applications.

Accordingly, it is a principal object of the instant invention to provide an improved process for the production of sodium zirconate by the caustic fusion of zircon on a continuous basis.

Another object of the instant invention is to provide an improved process for continuously producing sodium zirconate by means of a commercially feasible process.

Other objects of the invention will in part be obvious and will in part appear hereinafter.

In the process of the instant invention, a zirconium bearing ore, such as zircon, is fused on a continuous basis with caustic soda in an externally fired rotary kiln at an elevated temperature. The temperature of the mixture increases stepwise as it moves down the kiln from an initial temperature of a few hundred degrees Fahrenheit to a maximum of about 1000° F. near the discharge end of the kiln.

The product is a mixture of sodium zirconate, sodium silicate and small quantities of unreacted zircon and sodium hydroxide and is continuously removed from the discharge end of the rotary kiln as a free-flowing granular material. Exactly why the product obtained is in the form of a free-flowing granular material is not completely understood. However, it is believed that water evolved in the reaction between the zircon and caustic soda causes the zircon sand to become porous, friable, and granular.

Sodium hydroxide, and preferably aqueous solutions of sodium hydroxide having a NaOH concentration of about 50 percent by weight, are utilized because they have been found satisfactory for decomposing zircon. The water takes no part in the actual fusion reaction of the zircon and the sodium hydroxide, since any water present in the mixture to be fused is driven off by the attendent high temperatures before the reaction begins. An aqueous solution of sodium hydroxide is preferred, however, because adequate mixing of the zircon and the sodium hydroxide is more readily obtained when the sodium hydroxide is in an aqueous solution.

The only area in the kiln where any permanent caking or deposit formation takes place is at the interface which forms between the liquid and the solid phases in the kiln. Some deposits in this area are generally desirable as they inhibit corrosion of the kiln. However, if it is desired to remove or partially remove the deposits in this area, the position of the interface can be temporarily altered. It has been discovered that the position of the interface is highly dependent upon the feed rate of zircon and caustic soda. An increase in the feed rate causes the interface to move downstream, that is, toward the product end of the kiln. Likewise, a decrease in the feed rate of the reactants causes the interface to move in the other direction. The position of the interface is, therefore, readily controlled.

If, then, an undesired build-up or deposit of reactants or products, or both, does occur at the interface, a temporary increase in the feed rate (which will cause the interface to move downstream) produces an increased concentration of free caustic at the point of the deposit. This increased caustic concentration removes the deposit. After a short time, decreasing the feed rate to its original value causes the interface to move back to its original position.

The above-described arrangement is decidely advantageous from the viewpoint of corrosion also. Corrosion rates in the instant process are slower than for batch-type operations. This is due to several factors: At the feed, or liquid end of the kiln, the concentration of caustic is high, but the temperature is relatively low because water is being removed and the caustic is being melted. At the interface, the caustic concentration is decreasing but may still be high, while the temperature is higher than before. However, in this area there is some deposit build-up on the walls which protects them from attack. Finally, in the portion of the kiln which contains the frit, the concentration of caustic is quite low, although the temperature is quite high. However, any reaction here must be of the solid-solid type, and the reaction rate is therefore quite low. One of the advantages of the present invention is that, at this point, the frit is fairly soft and does not abrade the walls to any extent.

In one preferred embodiment of the instant invention, the axis of the kiln is horizontal or tilted a maximum of about ⅛" per foot of kiln. Little or no tilt is desirable in order that the residence time of the reactants in the kiln be sufficient to provide for the reaction going substantially to completion and in order to allow sufficient time for lumps formed to be abraded into free-flowing frit. Movement of material through the kiln is brought about by the hydrostatic head of the liquid and the free-flowing frit.

In another embodiment a long slender bar (or bars) is placed in the kiln. This bar rides the interface and keeps it from building up excessively. The bar also serves to reduce the particle size of the free-flowing product.

As pointed out previously, it is essential that the kiln be fired externally. The reaction of the caustic and the zircon begins to take place at about 560° F. However, it is preferred to operate at between about 850° F. to 1000° F. so as to assure complete "opening" of the zircon ore. External firing of the kiln is extremely important because the reaction between caustic soda and carbon dioxide (from fluegas) to form sodium carbonate is prevented. This reaction would deplete the supply of caustic soda and lower the yield in the fusion reaction. Sodium carbonate can be used in caustic fusion reactions, but the required temperature for the reaction is 400° F. to 600° F. higher than that required if sodium hydroxide is utilized. Moreover, sodium carbonate fusions yield glassy products rather than the free-flowing, porous, friable frit of the present invention.

In order to describe the invention more fully, a nonlimiting illustrative example of the invention is set forth below:

Example I

A stainless steel rotating kiln, 12 inches in diameter by 8 feet long with a ⅛ inch wall, was used in the following run. Of the 8 feet length, 79 inches were heated externally by direct gas flames. Two thermocouples, one in the discharge end of the kiln and one in the hot air exhaust line at the feed end of the kiln, were used to indicate temperatures. A weir, 1 to 1½ inches high, was placed at the discharge end of the kiln. The zircon sand and caustic solution were dumped into separate feed hoppers. No attempt was made to premix the reactants. A stainless steel rod, 1 inch in diameter and about 20 inches long, was inserted into the feed end of the kiln to break up any excess deposits which might form at the liquid-solid interface.

Feed was begun at a temperature of about 500° F. Small charges of sand and caustic were weighed and fed to the kiln at intervals of 2½ minutes. These charges comprised approximately 2 pounds of sand and 4.4 pounds of 50 percent NaOH. The temperature was raised slowly to 1000° F. at about 60 minutes a slight discharge over the delivery weir began. The feedings were decreased to an average of 1.3 pounds of sand, and it was noted that the solid-liquid interface retreated upstream.

At a time of about 100 minutes, product was passing over the delivery weir slowly but continuously. "Grab" samples were taken from the product analyzed 1 to 10 percent unopened ore.

Obviously, certain changes may be made in the above described process without departing from the scope of the invention. For example, instead of utilizing rods or bars to keep the interface from building up excessively as mentioned above, a mechanical scraper could easily be utilized. Further, this scraper could operate continuously thereby preventing an initial build-up at the interface.

Therefore, it is intended that all matter contained in the above description shall be interpreted as illustrative and not in a limiting sense.

What is claimed is:

1. A process for continuously fusing zircon sand with caustic soda to produce sodium zirconate and sodium silicate which comprises feeding zircon and caustic soda in one end of a rotary kiln, heating said kiln externally to a temperature above about 560° F. and recovering the sodium silicate-sodium zirconate product at the product end of said kiln, the kiln being heated by external combustion and the combustion products being excluded from the interior of the kiln.

2. A process for continuously fusing zircon sand with caustic soda to produce sodium zirconate and sodium silicate which comprises feeding zircon and a solution of caustic soda to one end of a substantially horizontal rotary kiln, firing said kiln externally to a temperature above about 560° F., and recovering the sodium silicate and sodium zirconate produced as a free-flowing frit from the product end of said kiln, the kiln being heated by external combustion and the combustion products being excluded from the interior of the kiln.

3. The process of claim 1 wherein a bar is inserted into the kiln in order to minimize excessive build-up at the liquid-solid interface.

4. A process for contniuously fusing zircon sand with caustic soda to produce sodium zirconate and sodium silicate which comprises feeding zircon and caustic soda into one end of a rotary kiln, heating said kiln externally to a temperature above about 560° F., intermittently varying the quantity of zircon and caustic soda fed into said kiln in order to intermittently vary the position of the liquid-solid interface in said kiln thereby preventing any excessive build-up at said liquid-solid interface, and recovering the sodium silicate-sodium zirconate product at the product end of said kiln, the kiln being heated by external combustion and the combustion products being excluded from the interior of the kiln.

5. The process of claim 2 wherein the slope of said rotary kiln is not more than about ⅛ inch per foot.

6. A process for continuously fusing zircon sand with caustic soda to produce sodium zirconate and sodium silicate which comprises feeding zircon and a solution of caustic soda into one end of a substantially horizontal rotary kiln, firing said kiln externally to a temperature between about 850° F. to 1000° F., and recovering the sodium silicate and sodium zirconate produced as a free-flowing frit from the product end of said kiln, the kiln being heated by external combustion and the combustion products being excluded from the interior of the kiln.

References Cited in the file of this patent

"Caustic Treatment of Zircon Sand," by Beyer, Spink, West and Wilhelm. Publ. by United States Atomic Energy Commission, Technical Information Service, Oak Ridge, Tenn., August 17, 1954. ISC-437 (Rev.).

"Extraction and Preparation of Zirconium Compounds From Zircon Ore by Wet Process." Toshio Ishino and Yoshikatsu Ogawa. Technol. Repts. Osaka Univ. and Chemical Abstracts, vol. 45, 8419 and 8420.